(12) United States Patent
Bolyard, Jr. et al.

(10) Patent No.: US 6,334,554 B1
(45) Date of Patent: Jan. 1, 2002

(54) SNUFFBACK VALVE FOR HOT MELT ADHESIVE

(75) Inventors: Edward W. Bolyard, Jr., Old Hickory, TN (US); Mark D. Bauer, Mt. Prospect, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/550,884

(22) Filed: Apr. 17, 2000

(51) Int. Cl.$^7$ ................................................ B67D 5/62
(52) U.S. Cl. ..................... 222/389; 222/504; 222/146.5
(58) Field of Search ............................. 222/146.5, 334, 222/389, 504, 509

(56) References Cited

U.S. PATENT DOCUMENTS

| | | | | |
|---|---|---|---|---|
| 3,854,631 A | * | 12/1974 | Moen ..................... | 222/146.5 |
| 5,228,604 A | * | 7/1993 | Zanini et al. ............. | 222/504 |
| 5,747,102 A | * | 5/1998 | Smith et al. ............. | 222/146.5 |
| 5,788,127 A | * | 8/1998 | Hanmer .................. | 222/504 |
| 5,788,128 A | * | 8/1998 | Hickey ................... | 222/504 |
| 5,934,521 A | * | 8/1999 | Yamada et al. ........... | 222/504 |

FOREIGN PATENT DOCUMENTS

DE    296 22 341    4/1997

* cited by examiner

Primary Examiner—Joseph A. Kaufman
(74) Attorney, Agent, or Firm—Schwartz & Weinrieb

(57) ABSTRACT

A snuffback valve assembly comprising a snuffback valve element having a tapered frusto-conically disposed downstream end portion for moving aerodynamically with respect to highly-viscous materials so as to effectively eliminate the phenomenon of bursting upon movement of the snuffback valve element from the closed to opened positions, and an upstream end portion which comprises an annular portion disposed perpendicular to the axis of the valve element, and a sharp-cornered region, for disrupting the flow parameters of the viscous material and for maintaining vacuum conditions within a valve chamber so as to prevent stringing of the viscous material when the valve element is moved from the opened to closed positions.

29 Claims, 3 Drawing Sheets

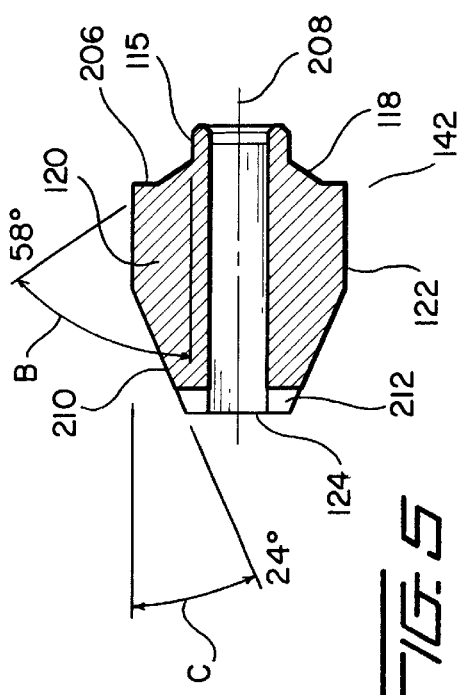
FIG. 5
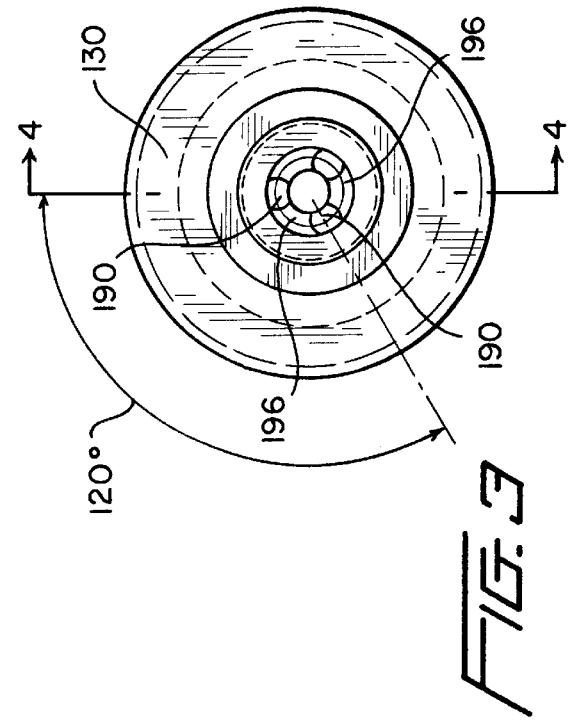
FIG. 3
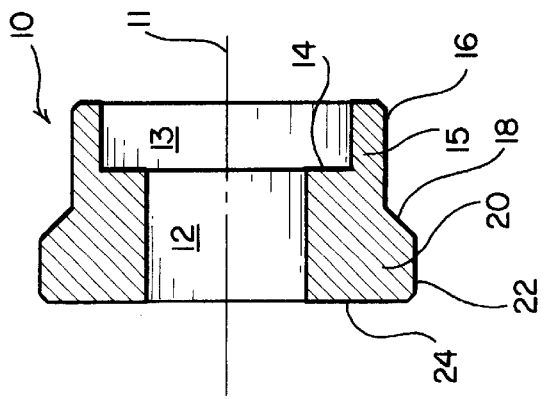
FIG. 1
(PRIOR ART)
FIG. 4

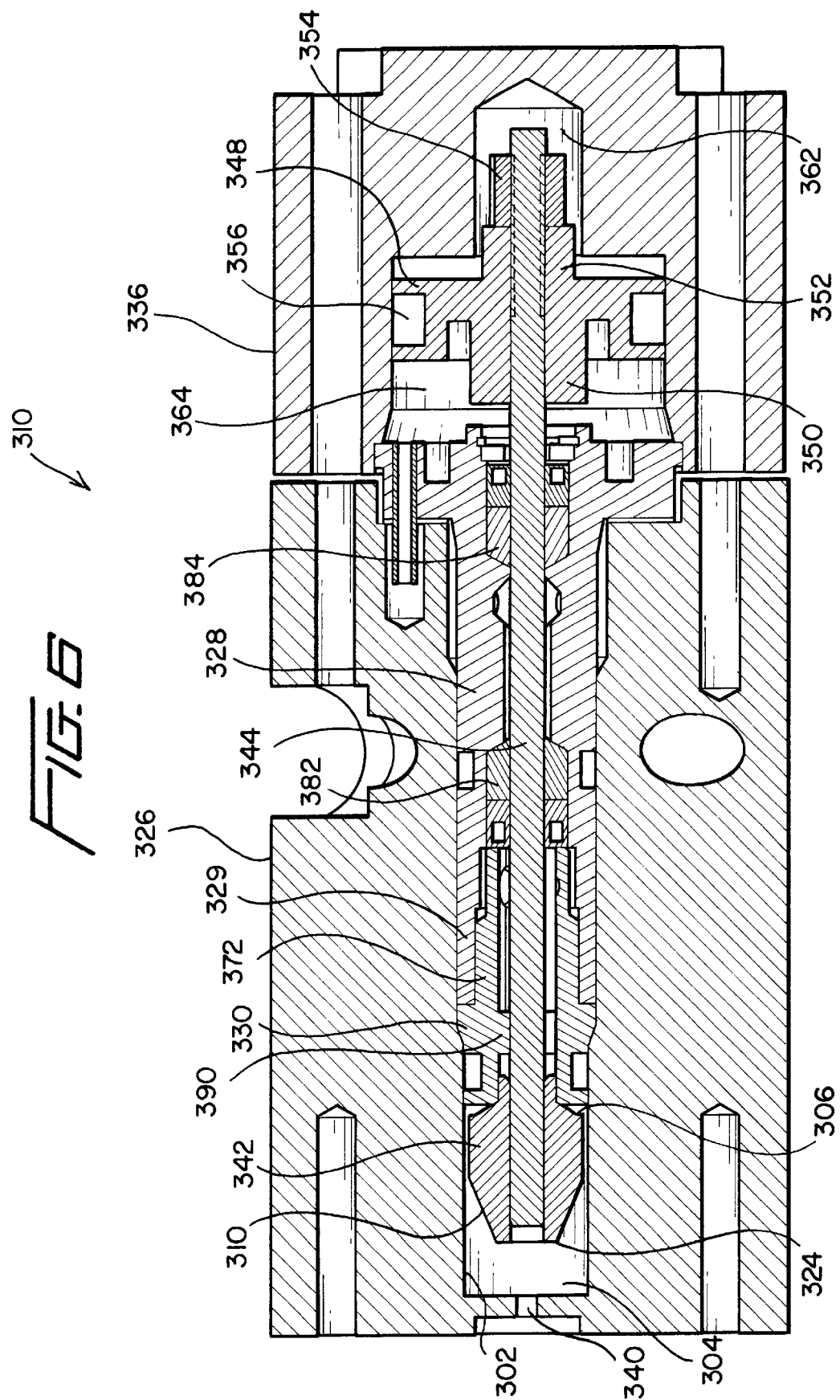

SNUFFBACK VALVE FOR HOT MELT ADHESIVE

FIELD OF THE INVENTION

The present invention relates generally to hot melt adhesive dispensing systems, and more particularly to a new and improved snuffback valve for dispensing hot melt adhesive whereby quick shutoff of the adhesive supply is able to be achieved at the end of a dispensing operation and during closure of the valve such that undesirable stringing of the adhesive does not occur.

BACKGROUND OF THE INVENTION

In connection with the dispensing of highly-viscous materials, such as, for example, hot melt adhesives, it is imperative that the dispensing system comprise what is known in the art as a snuffback valve by means of which shut off of the dispensed adhesive is readily achieved upon closure of the valve whereby stringing of the adhesive does not occur. One type of known PRIOR ART snuffback valve is disclosed in FIG. 1 wherein the snuffback valve is generally indicated by the reference character 10. The snuffback valve 10 is adapted to be fixedly mounted upon a valve stem, note shown, which, in turn, is adapted to be fixedly connected, for example, to a piston drive, also not shown, by means of which the snuffback valve is moved linearly with respect to its valve seat member, not shown, so as to attain its relative opened and closed positions with respect to the valve seat.

More particularly, the PRIOR ART snuffback valve 10 comprises a substantially cylindrical structure having an axis 11, and is seen to comprise a first bore 12 and a second counterbored portion 13 with a shoulder 14 defined therebetween. The valve stem, not shown, extends through the counterbored portion 13 and the valve end of the stem is seated upon the shoulder portion 14. A bolt type fastener, not shown, extends through bore 12 and threadedly engages the valve end of the valve stem, not shown, so as to fixedly mount the valve stem within the valve 10. The valve 10 further comprises a cylindrical throat portion 15 which has an external peripheral cylindrical surface portion 16 wherein the external surface portion 16 is adapted to be disposed internally within the valve seat member, not shown, when the snuffback valve 10 is moved to its closed position so as to cooperate with the valve seat member in terminating flow of the adhesive. An annular tolerance, gap, or space, of, for example, 0.010 inches, is defined between the external cylindrical surface portion 16 of the snuffback valve 10 and the internal peripheral cylindrical surface portion of the valve seat member, not shown, so as to readily permit linear movement of the snuffback valve 10 with respect to its valve seat member, not shown, during opening and closing cycles of the valve, as well as to define or determine the snuffback action of the valve 10. Downstream of the throat portion 15, the snuffback valve 10 comprises an external frusto-conical surface portion 18 which is adapted to be mated with a complimentarily shaped frusto-conical surface portion of the valve seat member, not shown, when the snuffback valve 10 is disposed at its closed position and is therefore seated upon the valve seat member.

Still further, the snuffback valve 10 comprises a second cylindrical portion 20 having an external peripheral cylindrical surface portion 22 which is disposed downstream of the frusto-conical portion 18 as considered in the dispensing direction of the hot melt adhesive. The external diametrical extent of the second peripheral cylindrical surface portion 20 is substantially greater than that of the throat portion 15 such that the external peripheral cylindrical surface portion 22 of the second cylindrical portion 20 cooperates with an internal peripheral cylindrical surface portion of a valve seat adapter or dispensing block, not shown, so as to define a discharge path for the adhesive to be dispensed. It is lastly noted that the front or down-stream face 24 of the snuffback valve 10 is disposed perpendicular to the axis 11 of the snuffback valve 10, and that the diametrical extent of the front or downstream face 24 of the snuffback valve 10 is such as to extend radially outwardly with respect to the axis 11 and has an external diametrical extent which is substantially equivalent to that of the second cylindrical portion 20.

While the aforenoted PRIOR ART type of snuffback, valve 10 has performed substantially satisfactorily, the structure of the aforenoted PRIOR ART snuffback valve 10 has in fact presented several operational problems or drawbacks. For example, it is firstly noted that the throat portion 15 of the PRIOR ART snuffback valve 10 has a substantially elongated axial length dimension. In addition, the external diametrical extent of the throat portion 15 is such that, as has been noted hereinbefore, a relatively large clearance of, for example, 0.010 inches, is defined between the external peripheral cylindrical surface portion 16 of the snuffback valve 10 and the internal peripheral cylindrical surface portion of the valve seat member, not shown. Consequently, while the snuffback valve 10 is of course able to achieve its closed position with respect to the valve seat, not shown, when the snuffback valve 10 is appropriately energized by its associated drive mechanism or system, not shown, such that dispensing of the adhesive by the valve 10 is terminated, the stroke of the snuffback valve 10 is considerably long, thereby rendering the speed of the valve relatively slow. This operative feature, which also results in more extensive wear of the seal members and therefore a shortening of the seal life, along with the relatively large tolerance or clearance space defined between the external peripheral cylindrical surface portion 16 of the throat portion and the internal peripheral cylindrical surface portion of the valve seat member, delays the onset or achievement of the snuffback operation of the valve thereby permitting stringing of the adhesive to nevertheless occur.

In addition, due to the provision or structure of the front or downstream surface or face 24 of the snuffback valve 10 as being disposed perpendicular to the axis 11 of the valve 10, and in addition, in view of the fact that such surface or face 24 extends radially outwardly so as to have substantially the same external diametrical extent as that of the second cylindrical portion 20, the snuffback valve 10 causes a phenomenon, known as bursting, to occur when a new adhesive dispensing cycle is commenced. Bursting is the sudden expulsion, discharge, or dispensing, upon the commencement of a new adhesive dispensing operation or cycle, of a predetermined amount or glob of adhesive which residually remains disposed between the downstream end or front face of the snuffback valve and the exit orifice, not shown, of the adhesive dispensing mechanism when a previous dispensing operation or cycle is terminated. The front face or surface 24 of the snuffback valve 10 therefore acts, in effect, as a type of plow forcing the glob or residual adhesive to be suddenly dispensed as a result of the linear movement of the valve 10 attendant the opening of the valve 10 and the unseating of the throat portion 15 of the valve 10 with respect to the valve seat member upon commencement of a subsequent dispensing cycle or operation.

A need therefore exists in the art for a new and improved snuffback valve wherein the structure of the valve is such that when dispensing of, for example, highly viscous materials, such as, for example, hot-melt adhesives, is to be achieved, the various operational drawbacks and disadvantages characteristic of such dispensing systems, such as, for example, stringing and bursting, do not occur, and in addition, the valve is characterized by means of a relatively short movement stroke with a relatively quick operational response time.

OBJECTS OF THE INVENTION

Accordingly, it is an object of the present invention to provide a new and improved snuffback valve for use in connection with the dispensing of highly viscous materials, such as, for example, hot melt adhesives.

Another object of the present invention is to provide a new and improved snuffback valve for use in connection with the dispensing of highly viscous materials, such as, for example, hot melt adhesives, which can effectively overcome the various operational drawbacks of conventional snuffback valves.

An additional object of the present invention is to provide a new and improved and improved snuffback valve for use in connection with the dispensing of highly viscous materials, such as, for example, hot melt adhesives, which can effectively prevent the occurrence of bursting and stringing upon the commencement and termination of dispensing operations.

A further object of the present invention is to provide a new and improved snuffback valve for use in connection with the dispensing of highly viscous materials, such as, for example, hot melt adhesives, which also exhibits a relatively short operational stroke and attendant response time during both the opening and closure movements of the valve member with respect to its valve seat, and in, addition, increased service life of the seal members.

SUMMARY OF THE INVENTION

The foregoing and other objectives are achieved in accordance with the principles and teachings of the present invention through the provision of a new and improved snuffback valve which comprises a poppet type valve which has a leading or downstream end portion having a substantially frusto-conical configuration whereby such leading or down-stream end portion is effectively aerodynamic with respect to the highly viscous material such that the occurrence of bursting, as characteristic of PRIOR ART snuffback valves, is effectively eliminated. In addition, the snuffback valve of the present invention comprises a trailing or upstream end portion which also has a substantially frusto-conical configuration, and the trailing or upstream frusto-conically configured end portion also has associated therewith an annular shoulder portion disposed substantially perpendicular to the longitudinal axis of the poppet valve. The shoulder portion thus forms a sharp, right-angled edge region with respect to the large-diameter main cylindrical portion of the poppet valve, and in addition, the shoulder portion also forms in effect a rearwardly facing plow portion. These two structural features of the shoulder portion serve to disturb the flow parameters or characteristics of the viscous material, and in addition, serve to establish and maintain partial vacuum conditions within the poppet valve chamber during the valve closing cycle in such a manner that, together with the fact that a substantially small tolerance or gap is defined between the throat portion of the poppet valve and the valve seat member, the phenomenon of stringing is likewise effectively eliminated.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a cross-sectional view of a PRIOR ART snuff-back valve;

FIG. 3 is a rear elevational view of the valves seat member of the valve assembly shown in FIG. 2;

FIG. 4 is a cross-sectional view of the valve seat member of FIG. 3 as taken along the lines 4—4 of FIG. 3;

FIG. 5 is a cross-sectional view of the poppet valve member of the valve assembly shown in FIG. 2; and FIG. 6 is a cross-sectional view similar to that FIG. 2 showing, however, a second embodiment of a new and improved snuffback valve assembly which is also constructed in accordance with the principles and teachings of the pre sent invention and which is particularly adaptable for use in connection with the dispensing of highly viscous materials, such as, for example, hot melt adhesives.

DETAILED DESCRIPTION OF THE PREFERRED EMBODIMENT

Figure 2:
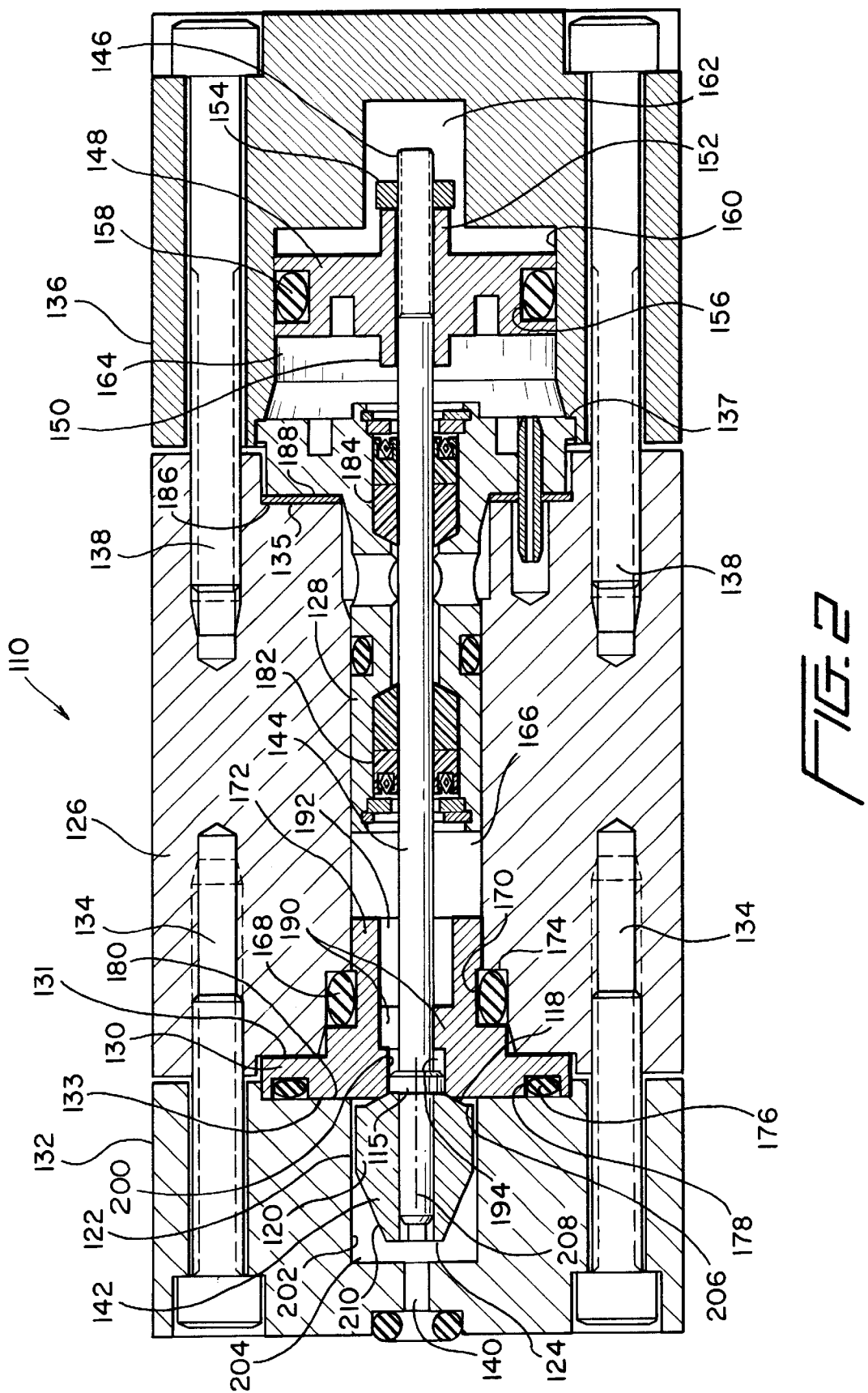
FIG. 2 is a cross-sectional view of a first embodiment of a new and improved snuffback valve assembly which is constructed in accordance with the principles and teachings of the present invention and which is particularly adaptable for use in connection with the dispensing of highly viscous materials, such as, for example, hot melt adhesives.

Referring now to the drawings, and more particularly to FIG. 2 thereof, a first embodiment of the new and improved snuffback valve assembly, constructed in accordance with the teachings and principles of the present invention, is illustrated and is generally indicated by the reference character 110. It is to be noted that in connection with the detailed description of the snuffback valves of the present invention, parts corresponding to those of the PRIOR ART snuffback valve will be denoted by similar reference characters, where possible, such that comparisons between the <valves of the present invention and that of the PRIOR ART can be readily made, however, the reference characters denoting the components parts of the valves of the present invention will be within the hundred series.

The snuffback valve assembly 110 is accordingly seen to comprise a main body member 126 wherein a seal cartridge assembly 128 is disposed within a first end of the main body member 126, while a valve seat member 130 is disposed within a second opposite end of the main body member 126. A valve seat adapter 132 is fixedly attached to the second end of the main body member 126 by means of a plurality of bolt fasteners 134 whereby the valve seat member 130 is secured within the valve assembly 110 as a result of being trapped between counterbored shoulder portions 131 and 133, respectively, of the main body member 126 and the valve seat adapter 132. In a similar manner, an air cylinder 136 is fixedly attached to the first end of the main body member 126 by means of a plurality of bolt fasteners 138 whereby the seal cartridge assembly 128 is secured within the valve assembly 110 as a result of being trapped between counterbored shoulder portions 135 and 137, respectively, of the main body member 126 and the air cylinder 136.

The valve seat adapter 132 is provided with an exit orifice 140 through which a highly viscous material, such as, for example, a hot melt adhesive, is able to be discharged, dispensed, or deposited onto, for example, a substrate, not shown. A poppet valve member 142 is provided for cooperation with the valve seat member 130 for controlling the flow of the highly viscous material, such as, for example, a hot melt adhesive, from the interior of the main body member 126 toward the exit orifice 140 depending upon the disposition of the poppet valve member 142 with respect to the valve seat member 130.

More particularly, the poppet valve member 142 is fixedly mounted upon a forward end of a valve stem 144 by means of, for example, a suitable brazing operation. The rear end portion of the valve stem 144 is threaded as at 146, and a piston 148 is threadedly engaged upon the threaded portion 146 of the valve stem 144. The threaded disposition of the piston 148 upon the threaded portion 146 of the valve stem 144 renders the same adjustable so as to predetermine the stroke of the valve member 142. The piston 148 has a forwardly projecting boss portion 150 which is adapted to engage the rear end of the seal cartridge assembly 128 when the piston 148 is moved forwardly so as to cause unseating of the poppet valve member 142 with respect to the valve seat member 130 and the opening of the valve assembly 110 whereby the hot melt adhesive material can be dispensed or discharged through the exit orifice 140 as will be more fully discussed hereinafter. In a similar manner, the piston 148 has a rearwardly projecting boss portion 152 which is adapted to be engaged by means of a locknut 154 which is also threadedly secured upon the threaded portion 146 of the valve stem 144 so as to maintain the aforenoted predetermined disposition of the piston 148 upon the valve stem 144 and thereby adjustably fix the stroke of the valve member 142. The piston 148 is further provided with a peripheral recess 156 within which an O-ring seal member 158 is disposed so as to provide sealing between the periphery of the piston 148 and the interior peripheral wall surface 160 of the air cylinder 136.

The piston 148 is adapted to be moved in a reciprocal manner, so as to in turn move the valve member 142 between its opened and closed positions with respect to the valve seat member 130, by means of pressurized air respectively and selectively supplied, from a suitable source, not shown, to an upstream air chamber 162 and a downstream air chamber 164 defined within the air cylinder 136. It is preferred that the pressurized air admitted to upstream chamber 162, and used for moving the piston 148 in the forward direction so as to achieve rapid opening of the valve member 142 with respect to the valve seat member 130 depending upon the particular application requirements, be at a pressure level of, for example, 30 psi, although the pressure level can be within the range of 20–90 psi, which also partially contributes to the elimination of the bursting phenomenon characteristic of the PRIOR ART snuffback valves as will be further discussed hereinafter. The pressurized air admitted to downstream chamber 164, and used for moving the piston 148 in the rearward direction so as to achieve closure of the valve member 142 with respect to the valve seat member 130, is preferably at a pressure level of, for example, 80 psi, although the pressure level can be within the range of 50–90 psi, whereby rapid closure of the valve member 142 is ensured so as to enhance or facilitate the snuffback operation of the valve member 142. In order to further ensure closure of the valve member 142 with respect to the valve seat member 130, under conditions wherein, for example, the valve assembly 110 may experience a failure in the supply of pressurized air into the downstream chamber 164, springs, not shown, may be disposed within the downstream chamber 164 and interposed between the rear end of the seal cartridge assembly 128 and the piston 148 so as to bias the piston 148 in the direction whereby valve member 142 is assuredly seated upon valve seat member 130.

A space 166, defined between the rear end portion of the valve seat member 130 and the forward end portion of the seal cartridge assembly 128, is adapted to receive the input flow of the hot melt adhesive, from a suitable source, not shown, such that the hot melt adhesive can then flow through the valve seat member 130, past the poppet valve member 142, and out the exit orifice 140 when the valve member 142 has been moved so as to be unseated from the valve seat member 130. Accordingly, in order to prevent any unwanted leakage of the hot melt adhesive along flow paths other than those as aforenoted, the valve seat member 130 is provided with a first O-ring member 168 disposed within a circumferential recess 170 defined within an external peripheral surface portion of its axially extending body portion 172 such that the O-ring member 168 sealingly engages a counterbored shoulder portion 174 of the main body member 126. A second O-ring member 176 is similarly disposed within an annular recess 178 defined within the front face 180 of the valve seat member 130 so as to sealingly engage the shoulder portion 133 of the valve seat adapter 132. It is noted that for similar purposes, the seal cartridge assembly 128 comprises a first axially forward seal assembly 182 sealingly disposed around valve stem 144 so as to effectively prevent the transmission or migration of any adhesive from space 166 rearwardly along valve stem 144, and a second axially rearward seal assembly 184 sealingly disposed around valve stem 144 so as to effectively prevent the transmission or migration of any pressurized air from downstream chamber 164 forwardly along valve stem 144. An annular gasket 186 is also interposed between a shoulder portion 188 of the seal cartridge assembly 128 and the shoulder portion 135 of the main body member 126.

With reference being made to FIGS. 3 and 4, in addition to FIG. 2, further details of the structure of the valve seat member 130 may be appreciated. In particular, the interior bore region of the valve seat member 130 is seen to comprise three, radially inwardly projecting bearing members 190 equiangularly spaced with respect to each other at 120° intervals. The bearing members 190 serve to radially support the valve stem 144 during its reciprocal movements attendant the opening and closing of the poppet valve member 142, and the bearing members 190 also serve to separate an upstream adhesive supply chamber 192 of the valve seat member 130 from a downstream valve throat chamber 194. In order to provide for the flow of adhesive from the upstream adhesive supply chamber 192 into the downstream valve throat chamber 194, spaces 196 are defined between respective pairs of the bearing members 190. It is lastly noted that the entranceway into the downstream valve throat chamber 194 is chamfered as at 198, and the chamfer angle A is noted as being 59°.

With reference now being made to FIG. 5 in addition to FIG. 2, further details of the poppet valve member 142 will be appreciated. As was the case with the PRIOR ART valve member 10 of FIG. 1, the poppet valve member 142 has an upstream throat portion 115 for disposition within the downstream valve throat chamber 194 of the valve seat member 130, however, unlike the valve member 10 of the PRIOR ART as shown in FIG. 1, the clearance or tolerance gap defined between the external peripheral surface of the throat portion 115 of the valve member 142 and the internal peripheral surface 200 of the valve throat chamber 194 can be in the range of 0.001–0.030 inches depending upon various conditions, for example, the particular adhesive, the glue application, and the like. It is appreciated that this clearance or tolerance gap comprises a tolerance or clearance gap that can be smaller than the tolerance or clearance gap defined between the external peripheral surface 16 of the valve member 10 and its valve seat member, not shown, by means of a factor of ten. This significant decrease in the clearance or tolerance space or gap comprises one factor which leads to a substantial improvement of the snuffback characteristics of the valve assembly 110 of the present invention.

It is further seen that the poppet valve member 142 has an external frusto-conical surface portion 118 and a cylindrical portion 120, the external peripheral cylindrical surface 122 of which cooperates with an internal peripheral cylindrical surface portion 202 of a poppet valve chamber 204 so as to define a predetermined annular flow passage therebetween through which the hot melt adhesive will flow so as to be dispensed through the poppet valve chamber 204 and the exit orifice 140. The tolerance or clearance gap defined between the external peripheral cylindrical surface 122 of the cylindrical portion 120 of the poppet valve member 142 and the internal peripheral cylindrical surface portion 202 of the poppet valve chamber 204 is 0.010 inches. The angle of frusto-conical surface 118 is indicated as angle B in FIG. 5 and is 58°, it being noted that the angle B of the frusto-conical surface 118 is just slightly different from the angle A of the chamfered surface of the valve seat member 130 such that precise surface-to-surface contact between the frusto-conical surface 118 of the valve member 142 and the chamfered surface 198 of the valve seat member 130 is desirably avoided so as to prevent the creation of any valve-sticking problems.

Unlike the valve member 10 of the PRIOR ART as disclosed in FIG. 1, it is noted further that the frusto-conical surface portion 118 of the valve member 142 does not intersect the external peripheral cylindrical surface portion 122 of the valve member 142, but to the contrary, an annular shoulder portion 206, disposed within a plane perpendicular to the axis 208 of the valve stem 144, is effectively interposed between the frusto-conical surface portion 118 and the external peripheral cylindrical surface portion 122 of the valve member 142. This shoulder portion 206 thus serves critical functions with respect to the snuffback properties or characteristics of the snuffback valve assembly 110 of the present invention. More particularly, the sharp corner defined between the shoulder portion 206 and the external peripheral cylindrical surface portion 122 of the valve member 142 serves to disrupt the flow parameters of the highly viscous material during closure of the valve member 142 with respect to its valve seat member 130. In addition, the annular shoulder portion 206, being disposed within the plane perpendicular to the axis 208 of the valve stem 144, acts, in effect, as a plow again disrupting the flow pattern of the highly viscous material and effectively forcing the material upstream or backwardly toward the valve seat member 130 so as to establish and maintain partial vacuum conditions within the poppet valve chamber 204 thereby achieving the desirable snuffback action and cut-off of the material flow upon closure of the valve member 142 with respect to its valve seat member 130 such that stringing does not occur.

Continuing further with reference still being made to FIGS. 2 and 5, and again unlike the PRIOR ART valve member 10 disclosed within FIG. 1, in lieu of the front or forward face or-surface 24 of the PRIOR ART valve member 10 being coextensive in its diametrical extent with respect to the cylindrical portion 20, the poppet valve member 142 of the present invention has a forward or front face or surface 124 which has a diametrical extent which is substantially less than that of the cylindrical portion 120. In addition, the forward or front face or surface 124 does not intersect the outer peripheral cylindrical surface portion 122 of the cylindrical portion 120 because a second frusto-conical surface portion 210 is provided upon the downstream or forward end of the poppet valve member 142. Frusto-conical surface portion 210 is preferably disposed at an angle C of approximately 24°, but the angle may be within a range of 10–45° with respect to the axis 208, and the provision of such a frusto-conical surface portion 210 is important with respect to the operation of the poppet valve member 142 in that the forward or front end portion of the poppet valve member 142 is now effectively aerodynamic, and generates less drag, with respect to the highly viscous material disposed within the poppet valve chamber 204 whereby, together with the aforenoted relatively low opening velocity of the poppet valve member 142, the aforenoted bursting phenomenon, characteristic of the PRIOR ART valve member 10, is effectively prevented or eliminated upon opening of the poppet valve member 142 and movement and disengagement of the same with respect to and from its associated valve seat member 130. It is lastly noted that in order to provide a flow path for the highly viscous material from the poppet valve chamber 204 to the exit orifice 140 when the poppet valve member 142 has been moved in the forward or downstream direction so as to disengage or unseat the valve member 142 from its valve seat 130, the forward end or front face or surface 124 of the poppet valve member 142 is provided with a transverse slot 212. Slot 212 also serves to accommodate a suitable tool, such as, for example, a screwdriver, by means of which the threaded positional adjustment of the piston 148 in the axial direction and along valve stem 144 is able to be achieved.

With reference lastly being made to FIG. 6, a second embodiment of a new and improved snuffback valve assembly constructed in accordance with the teachings and principles of the present invention is disclosed and is generally indicated by the reference character 310. It is to be noted that the component parts of this embodiment which correspond to the component parts of the first embodiment illustrated in FIG. 2 will be designated by similar reference characters except that the reference characters for the second embodiment of FIG. 6 will be within the 300 series. In addition, it is also noted that the overall structure of the second embodiment of the poppet snuffback valve assembly 310 illustrated in FIG. 6 is quite similar to the first embodiment of the poppet snuffback valve assembly 110 illustrated in FIG. 2, and consequently, a thorough detailed description of the poppet snuffback valve assembly 310 will be omitted for brevity purposes, and only the distinguishing features or characteristics of the poppet snuffback valve assembly 310, relative to the poppet snuffback valve assembly 110 of FIG. 2, will be discussed.

More particularly, it is seen that one of the primary differences between the snuffback valve assembly 310 illustrated in FIG. 6, as compared to the snuffback valve assembly illustrated in FIG. 2, comprises the fact that the body member 126 and the seat adapter 132 have effectively been combined into a single body member unit or entity 326, and that the single body member unit or entity is adapted to be fixedly secured to the air cylinder 336. In addition, the forward or downstream end of the seal cartridge assembly 328 has a forwardly projecting annular portion 329 which defines a recess for accommodating or housing the axially extending, rearwardly projecting annular body portion 372 of the valve seat member 330. In this manner, the poppet valve member 342 and the valve stem 344, the valve seat member 330, the seal cartridge assembly 328, and the piston 348 comprise a single assembly which may be readily mounted within an elongated axial cavity 327 defined within the single body member unit or entity 326 whereupon the air cylinder 336 can then be bolted thereto so as to complete the overall snuffback valve assembly 310.

Thus, it may be seen that in accordance with the teachings and principles of the present invention, a new and improved snuffback valve assembly for use in connection with the dispensing or deposition of highly viscous materials, such as, for example, hot melt adhesives, has been developed wherein the aforenoted bursting and snuffback or cut-off problems or operational difficulties characteristic of PRIOR ART snuffback valves have been effectively overcome and eliminated. In particular, the forward or downstream end of the snuffback poppet valve member has a frusto-conical configuration such that the taper thereof effectively moves through the viscous material in an aerodynamic manner with minimum drag characteristics, and in addition, the opening movement of the valve member is achieved at a relatively low velocity. These structural and operative characteristics serve to eliminate the bursting phenomenon characteristic of the PRIOR ART snuffback valves. In addition, the provision of the rearwardly disposed shoulder portion upon the poppet valve member serves to disturb the flow characteristics of the viscous marterial, forces the viscous material rearwardly or backwardly upstream, and creates and maintains partial vacuum conditions within the poppet valve chamber of the seat adapter or body member whereby stringing of the viscous material is effectively prevented.

Obviously, many variations and modifications of the present invention are possible in light of the above teachings. It is therefore to be understood that within the scope of the appended claims, the present invention may be practiced otherwise than as specifically described herein.

What is claimed AS new and desired to be protected by Letters Patent of the United States of America, is:

1. A snuffback valve assembly for use in connection with the dispensing of highly viscous materials, comprising:
   a housing having an exit orifice defined therein through which highly viscous materials are to be dispensed;
   a valve seat member disposed upstream of said exit orifice and comprising a valve throat chamber through which highly viscous materials can be conducted toward said housing exit orifice; and
   a snuffback valve element movable between opened and closed positions with respect to said valve seat member and having an upstream throat portion for disposition within said valve throat chamber of said valve seat member so as to terminate flow of said highly viscous materials through said valve throat chamber of said valve seat member and toward said exit orifice when said valve element is disposed at said closed position and seated upon said valve seat member, and having a downstream end portion which is tapered so as to prevent bursting of said highly viscous materials from said exit orifice when said snuffback valve element is moved from said closed position to said opened position.

2. The snuffback valve assembly as set forth in claim 1, wherein:
   said downstream end portion of said snuffback valve element has a frusto-conically shaped configuration for aerodynamically moving within and with respect to said highly viscous materials so as to prevent forceful bursting expulsion of said highly viscous materials from said exit orifice.

3. The snuffback valve assembly as set forth in claim 1, wherein:
   a tolerance gap of between 0.001 and 0.030 inches is defined between an outer peripheral surface of said throat portion of said snuffback valve element and an inner peripheral surface of said throat chamber of said valve seat member so as to terminate said flow of said highly viscous materials through said throat chamber of said valve seat member when said snuffback valve element is disposed at said closed position and seated upon said valve seat member.

4. The snuffback valve assembly as set forth in claim 2, wherein:
   said snuffback valve element has a longitudinal axis; and
   a transverse slot is defined within said down-stream end portion of said snuffback valve element so as to enable said highly viscous materials to be conducted to said exit orifice.

5. The snuffback valve assembly as set forth in claim 4, wherein:
   said frusto-conically configured downstream end portion of said snuffback valve element defines an angle which is within the range of 10–45° with respect to said longitudinal axis of said snuffback valve element.

6. The snuffback valve assembly as set forth in claim 5, wherein:
   said angle of said frusto-conically configured down stream end portion of said snuffback valve element comprises 24°.

7. The snuffback valve assembly as set forth in claim 1, further comprising:
   a valve stem fixedly secured at a first end thereof to said snuffback valve element;
   a piston member fixedly mounted upon a second opposite end of said valve stem; and
   means for driving said piston member, said valve stem, and said snuffback valve element in a first direction corresponding to closing of said snuffback valve element with respect to said valve seat member at a first predetermined velocity so as to ensure rapid closure of said snuffback valve assembly, and in a second direction corresponding to opening of said snuffback valve element with respect to said valve seat member at a second predetermined velocity which is less than said first predetermined velocity so as to prevent said bursting expulsion of said highly viscous materials from said exit orifice.

8. The snuffback valve assembly as set forth in claim 7, wherein:
   said means for driving said piston member in said first direction and at said first predetermined velocity comprises pressurized air within a range of 50–90 psi, and said means for driving said piston member in said second direction and at said second predetermined velocity comprises pressurized air within a range of 20–90 psi.

9. The snuffback valve assembly as set forth in claim 8, wherein:
   said pressurized air operatively associated with said first predetermined velocity is at a pressure level of 80 psi; and
   said pressurized air operatively associated with said second predetermined velocity is at a pressure level of 30 psi.

10. The snuffback valve assembly as set forth in claim 8, wherein:

said piston member is threadedly engaged upon said second end portion of said valve stem so as to adjustably alter the stroke of said snuffback valve element with respect to said valve seat member.

11. The snuffback valve assembly as set forth in claim 10, wherein:

said valve seat member comprises a plurality of equiangularly spaced bearing members provided upon internal surface portions of said valve seat member for supporting said valve stem during reciprocating movements of said valve stem and said snuffback valve element corresponding to opening and closing of said snuffback valve element with respect to said valve seat member.

12. The snuffback valve assembly as set forth in claim 11, further comprising:

passageways defined within said valve seat member and between said plurality of equiangularly spaced bearing members for conducting said highly viscous materials through said valve seat member toward said exit orifice.

13. The snuffback valve assembly as set forth in claim 1, wherein:

said highly viscous materials comprise hot melt adhesives.

14. The snuffback valve assembly as set forth in claim 8, further comprising:

seal means mounted upon said valve stem for preventing the transmission of said highly viscous materials towards said piston, and for preventing the transmission of said pressurized air toward said valve seat member.

15. The snuffback valve assembly as set forth in claim 14, wherein:

said housing comprises a three-piece housing comprising a main body, a valve seat adapter having said exit orifice defined therein and fixedly secured to a first end of said main body for fixedly securing said valve seat member between said main body and said valve seat adapter, and an air cylinder having said piston disposed therein and fixedly secured to a second opposite end of said main body for fixedly securing said seal means between said main body and said air cylinder.

16. A snuffback valve assembly for use in connection with the dispensing of highly viscous materials, comprising:

a housing having an exit orifice defined therein through which highly viscous materials are to be dispensed, and a valve chamber;

a valve seat member disposed upstream of said exit orifice and comprising a valve throat chamber through which highly viscous materials can be conducted toward said housing exit orifice; and a snuffback valve element movably disposed within said valve throat chamber between opened and closed positions with respect to said valve seat member and having an upstream throat portion for disposition within said valve throat chamber of said valve seat member so as to terminate flow of said highly viscous materials through said valve throat chamber of said valve seat member and toward said exit orifice when said valve element is disposed at said closed position and seated upon said valve seat member, and having a longitudinal axis and an upstream end portion which is disposed substantially perpendicular to said longitudinal axis so as to create and maintain vacuum conditions within said valve chamber so as to prevent stringing of said highly viscous materials from said exit orifice when said snuffback valve element is moved from said opened position to said closed position.

17. The snuffback valve assembly as set forth in claim 16, wherein:

said snuffback valve element has an outer peripheral surface portion which cooperates with an internal peripheral surface portion of said valve chamber for defining an annular passageway through which said highly viscous material flows from said valve throat chamber to said exit orifice, and an annular corner region defined at the junction of said outer peripheral surface portion and said perpendicularly disposed upstream end portion of said snuffback valve element for disrupting the flow parameters of said highly viscous materials so as to assist in the prevention of said stringing of said highly viscous materials from said exit orifice.

18. A snuffback valve assembly for use in connection with the dispensing of highly viscous materials, comprising:

a housing having an exit orifice defined therein through which highly viscous materials are to be dispensed;

a valve seat member disposed upstream of said exit orifice and comprising a valve throat chamber through which highly viscous materials can be conducted toward said housing exit orifice; and a snuffback valve element movable between opened and closed positions with respect to said valve seat member and having an upstream throat portion for disposition within said valve throat chamber of said valve seat member so as to terminate flow of said highly viscous materials through said valve throat chamber of said valve seat member and toward said exit orifice when said valve element is disposed at said closed position and seated upon said valve seat member, having a downstream end portion which is tapered so as to prevent bursting of said highly viscous materials from said exit orifice when said snuffback valve element is moved from said closed position to said opened position, and having a longitudinal axis and an upstream end portion which is disposed substantially perpendicular to said longitudinal axis so as to create and maintain vacuum conditions within said valve chamber so as to prevent stringing of said highly viscous materials from said exit orifice when said snuffback valve element is moved from said opened position to said closed position.

19. The snuffback valve assembly as set forth in claim 18, wherein:

said downstream end portion of said snuffback valve element has a frusto-conically shaped configuration for aerodynamically moving within and with respect to said highly viscous materials so as to prevent forceful bursting expulsion of said highly viscous materials from said exit orifice.

20. The snuffback valve assembly as set forth in claim 18, further comprising:

a valve stem fixedly secured at a first end thereof to said snuffback valve element;

a piston member fixedly mounted upon a second opposite end of said valve stem; and means for driving said piston member, said valve stem, and said snuffback valve element in a first direction corresponding to closing of said snuffback valve element with respect to said valve seat member at a first predetermined velocity so as to ensure rapid closure[]of said snuffback valve assembly, and in a second direction corresponding to opening of said snuffback valve element with respect to said valve seat member at a second predetermined velocity so as to prevent said bursting expulsion of said highly viscous materials from said exit orifice.

21. The snuffback valve assembly as set forth in claim 20, wherein:
said means for driving said piston member in said first direction and at said first predetermined velocity comprises pressurized air which is within the range of 50–90 psi, and said means for driving said piston member in said second direction and at said second predetermined velocity comprises pressurized air which is within the range of 20–90 psi.

22. The snuffback valve assembly as set forth in claim 21, wherein:
said pressurized air operatively associated with said first predetermined-velocity is at a pressure level of 80 psi; and
said pressurized air operatively associated with said second predetermined velocity is at a pressure level of 30 psi.

23. The snuffback valve assembly as set forth in claim 18, wherein:
said snuffback valve element has an outer peripheral surface portion which cooperates with an internal peripheral surface portion of said valve chamber for defining an annular passageway through which said highly viscous material flows from said valve throat chamber to said exit orifice, and an annular corner region defined at the junction of said outer peripheral surface portion and said perpendicularly disposed upstream end portion of said snuffback valve element for disrupting the flow parameters of said highly viscous materials so as to assist in the prevention of said stringing of said highly viscous materials from said exit orifice.

24. A snuffback valve for use in connection with the dispensing of highly viscous materials, comprising:
a snuffback valve element movable between opened and closed positions with respect to a valve seat member and having an upstream throat portion for disposition within a valve throat chamber of the valve seat member so as to terminate flow of said highly viscous materials through the valve throat chamber of the valve seat member and toward an exit orifice when said valve element is disposed at said closed position and seated upon the valve seat member, and having a downstream end portion which is tapered so as to prevent bursting of said highly viscous materials from said exit orifice when said snuffback valve element is moved from said closed position to said opened position.

25. The snuffback valve as set forth in claim 24, wherein:
said downstream end portion of said snuffback valve element has a frusto-conically shaped configuration for aerodynamically moving within and with respect to said highly viscous materials so as to prevent forceful bursting expulsion of said highly viscous materials from the exit orifice.

26. A snuffback valve for use in connection with the dispensing of highly viscous materials, comprising:
a snuffback valve element movably disposed within a valve chamber between opened and closed positions with respect to a valve seat member and having an upstream throat portion for disposition within a valve throat chamber of the valve seat member so as to terminate flow of said highly viscous materials through the valve throat chamber of the valve seat member and toward a downstream exit orifice when said valve element is disposed at said closed position and seated upon the valve seat member, and having a longitudinal axis and an upstream end portion which is disposed substantially perpendicular to said longitudinal axis so as to create and maintain vacuum conditions within the valve chamber so as to prevent stringing of said highly viscous materials from the exit orifice when said snuffback valve element is moved from said opened position to said closed position.

27. A snuffback valve as set forth in claim 26, wherein:
said snuffback valve element has an outer peripheral surface portion which cooperates with an internal peripheral surface portion of the valve chamber for defining an annular passageway through which said highly viscous material flows from the valve throat chamber to the exit orifice, and an annular corner region defined at the junction of said outer peripheral surface portion and said perpendicularly disposed upstream end portion of said snuffback valve element for disrupting the flow parameters of said highly viscous materials so as to assist in the prevention of said stringing of said highly viscous materials from the exit orifice.

28. A snuffback valve assembly for use in connection with the dispensing of highly viscous materials, comprising:
a valve seat member having a valve throat chamber through which highly viscous materials can be conducted;
a snuffback valve element movable between opened and closed positions with respect to said valve seat member and having an upstream throat portion for disposition within said valve throat chamber of said valve seat member so as to terminate flow of said highly viscous materials through said valve throat chamber of said valve seat member and toward a downstream exit orifice when said valve element is disposed at said closed position and seated upon said valve seat member;
a valve stem fixedly secured at a first end thereof to said snuffback valve element;
a piston member fixedly mounted upon a second opposite end of said valve stem and adapted to be actuated by pressurized air so as to move said snuffback valve element between said opened and closed positions; and
seal means mounted upon said valve stem for preventing the transmission of said highly viscous materials towards said piston member, and for preventing the transmission of said pressurized air toward said valve seat member, and defining a recessed portion for housing said valve seat member,
whereby said snuffback valve element and said valve stem, said valve seat member, said seal means, and said piston member comprise a single entity.

29. The snuffback valve assembly as set forth in claim 28, further comprising:
a two-piece housing within which said single entity, comprising said snuffback valve element and said valve stem, said valve seat member, said seal means, and said piston member, is mounted.

\* \* \* \* \*